United States Patent
Feliss et al.

(10) Patent No.: US 6,914,739 B2
(45) Date of Patent: Jul. 5, 2005

(54) CLOSED LOOP LUBRICATION SYSTEM FOR MOVING MAGNETIC MEDIA

(75) Inventors: Norbert A. Feliss, Sunnyvale, CA (US); Donald Ray Gillis, San Jose, CA (US); Thomas A. Gregory, Campbell, CA (US); Sylvia Lui Lee, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 216 days.

(21) Appl. No.: 10/295,442

(22) Filed: Nov. 14, 2002

(65) Prior Publication Data

US 2004/0095668 A1 May 20, 2004

(51) Int. Cl.[7] ............................................. G11B 15/18
(52) U.S. Cl. ...................................................... 360/69
(58) Field of Search ............................. 360/69, 71, 59, 360/135; 714/721; 374/31; 184/105.1

(56) References Cited

U.S. PATENT DOCUMENTS

| | | | |
|---|---|---|---|
| 5,138,506 A | | 8/1992 | Beck et al. |
| 5,202,803 A | | 4/1993 | Albrecht et al. |
| 5,210,673 A | * | 5/1993 | Ito et al. ..................... 360/135 |
| 5,229,899 A | | 7/1993 | Brown et al. |
| 5,309,301 A | | 5/1994 | Gregory et al. |
| 5,543,983 A | | 8/1996 | Gregory et al. |
| 5,724,202 A | * | 3/1998 | Choi et al. ..................... 360/71 |
| 5,742,449 A | | 4/1998 | Gregory et al. |
| 6,011,666 A | * | 1/2000 | Wakamatsu .................. 360/69 |
| 6,125,969 A | * | 10/2000 | Graf et al. ................ 184/105.1 |
| 6,249,890 B1 | * | 6/2001 | Ukani et al. ................. 714/721 |
| 6,295,861 B1 | * | 10/2001 | Tom et al. .................. 73/24.06 |
| 6,439,765 B2 | * | 8/2002 | Smith ........................... 374/31 |
| 6,731,446 B2 | * | 5/2004 | Ikeda et al. ..................... 360/59 |

FOREIGN PATENT DOCUMENTS

JP          59218668 A1    12/1984

* cited by examiner

*Primary Examiner*—David Hudspeth
*Assistant Examiner*—Fred F. Tzeng
(74) *Attorney, Agent, or Firm*—G. Marlin Knight

(57) ABSTRACT

A data storage system is described with a system for controlling the amount of lubricant being dispensed from the reservoir using a feedback loop that includes at least one sensor output for a physical parameter inside device such as temperature, humidity and fly-height. In one embodiment the lubricant reservoir housing is equipped with a movable shutter over an aperture in the lubricant reservoir housing. The area of the aperture through which the lubricant vapor can pass is controlled by moving the shutter. In another embodiment the lubricant reservoir housing is supplied with a lubricant diffusion packet such as an effusion cell or diffusion tube containing liquid lubricant. An energy source for the lubricant diffusion packet allows the temperature of the lubricant and, therefore, its vapor pressure, to be increased when the need for additional lubricant is sensed. In a preferred embodiment the output from a Quartz Crystal Microbalance (QCM) with an overcoat similar to that used on a disk is used to measure the degree of lubricant saturation inside the drive by sensing the change in the frequency of a crystal oscillator due to the lubricant adsorbing on a surface of the QCM.

24 Claims, 2 Drawing Sheets

CLOSED LOOP LUBRICATION SYSTEM FOR MOVING MAGNETIC MEDIA

FIELD OF THE INVENTION

The invention relates to the field of magnetic data storage devices with moving magnetic media and more particularly to systems for controlling the amount of lubricant which is applied to the moving magnetic media.

BACKGROUND OF THE INVENTION

A typical prior art head and disk system 10 is illustrated in FIG. 1. In operation the magnetic transducer 20 is supported by the suspension 13 as it flies above the disk 16. The magnetic transducer, usually called a "head" or "slider" is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. Typically there are two pairs of electrical contact pads (not shown); one pair each for the read and write heads 12, 23. Wires or leads 14 are connected to these pads and routed in the suspension 13 to the drive's control system (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material which serves as the recording medium in which the write head 23 records the magnetic transitions in which information is encoded. The read head 12 reads magnetic transitions as the disk rotates under the air-bearing surface (ABS) of the magnetic transducer 20. Although use of air-bearings has dominated commercial disk drive, the use of hydrodynamic bearings is known. A hydrodynamic bearing exists when the magnetic transducer 20 skis on a liquid lubricant surface on the disk 16 as the disk rotates.

A thin layer of lubricant 25 is typically applied to disk 16 in drives using an air-bearing, as well as, those using a hydrodynamic bearing. A source of additional lubricant is needed during the life of the disk drive to replace lubricant which is lost through various mechanisms. Lubricant reservoir housing 34 contains lubricant packet 32 which forms vapor 35 which escape from the reservoir housing 34 into the internal environment of the drive and adsorbs on the disk 16. In some systems at least part of the lost lubricant is recaptured and returned to the reservoir for re-use. Typically, the geometry of the lubricant packet 32 is a thin rectangular structure that is comprised of synthetic and/or natural fibers or a suitable foam or sponge-like medium contained in a particle-free woven fabric covering or other particle-free medium. The lubricant packet 32 contains a specified quantity of volatile lubricant that is held inside the packet by capillary containment. The packet stores a specific volume of lubricant that is slowly transferred to the heads and disks to keep them constantly lubricated and bathed in a vapor of lubricant so as to prevent premature failure of the disk drive. However, in an active type of reservoir system, the lubricant packet is inserted into a device which will vary the amount of lubricant vapor based on sensor information.

A system for dynamically controlling the amount of lubricant being released from the reservoir has been described in U.S. Pat. No. 5,543,983 to Gregory, et al. The Gregory system is directed at a drive in which the head is supported above the disk by a hydrodynamic bearing. In this type of system the fly-height is directly affected by the thickness of the lubricant. The disclosed system obtains fly-height information from the drive's servo system to adjust the temperature of the lubricant in the reservoir to control the amount of lubricant vapor being emitted from the reservoir and therefore the thickness of the lubricant on the disk's surface.

What is needed is an improved system for controlling the amount of lubricant on the magnetic media.

SUMMARY OF THE INVENTION

A system is described for controlling the amount of lubricant being dispensed from the reservoir using a feedback loop that includes at least one sensor output. In one embodiment the lubricant reservoir housing is equipped with a movable shutter over the aperture in the lubricant reservoir housing. The area of the aperture through which the lubricant vapor can pass is controlled by moving the shutter. In another embodiment the lubricant reservoir housing is supplied with an lubricant diffusion packet such as an effusion cell or diffusion tube containing liquid lubricant. An energy source for the lubricant diffusion packet allows the temperature of the lubricant and, therefore, its vapor pressure, to be increased when the need for additional lubricant is sensed.

The one or more sensors used in the feedback loop will supply information about the internal environment and/or the performance of the drive that reflect the state of the lubricant thickness and its effectiveness. Environmental parameters which can be measured include temperature, humidity and the adsorbate thickness of the lubricant. The output from a Quartz Crystal Microbalance (QCM) with an overcoat similar to that used on a disk can be used to measure the degree of lubricant saturation inside the drive by sensing the change in the frequency of a crystal oscillator due to the lubricant adsorbing on the QCM. Performance measurements can include the magnetoresistance of the read heads and the fly-height of the heads.

DETAILED DESCRIPTION OF THE INVENTION AND THE PREFERRED EMBODIMENTS

The active type of reservoir system insures that the drive will always maintain a "controlled" quantity of lubricant in a vapor state above all the disks. The quantity of lubricant can be optimized for the disk and head environment at any temperature, humidity, and atmospheric pressure by an electrical closed-loop control system which varies the lubricant vapor density established within the disk drive.

Figure 1:
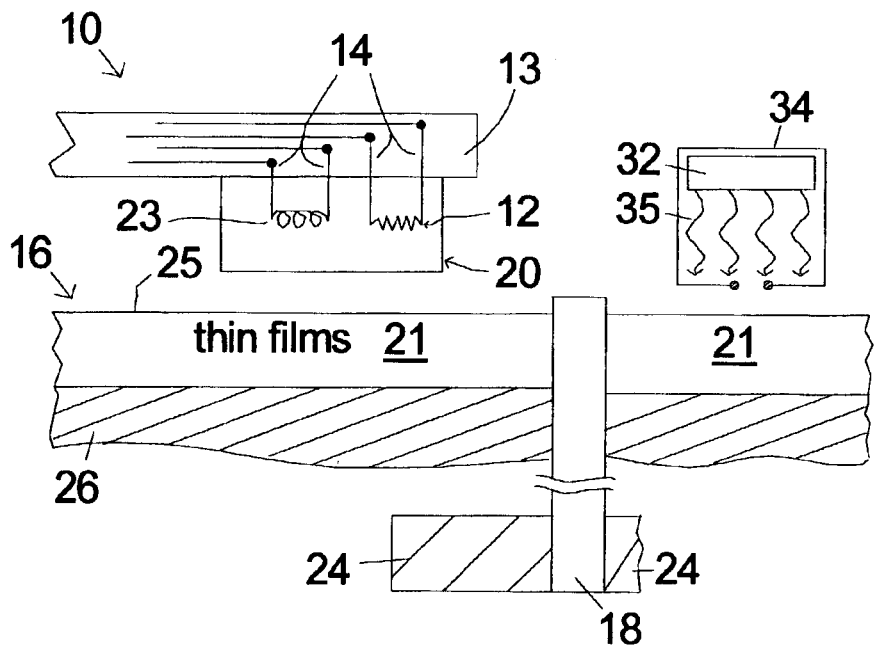
FIG. 1 is an illustration of the prior art showing the relationships between the heads, disk and the lubricant reservoir in a disk drive.
Figure 2:
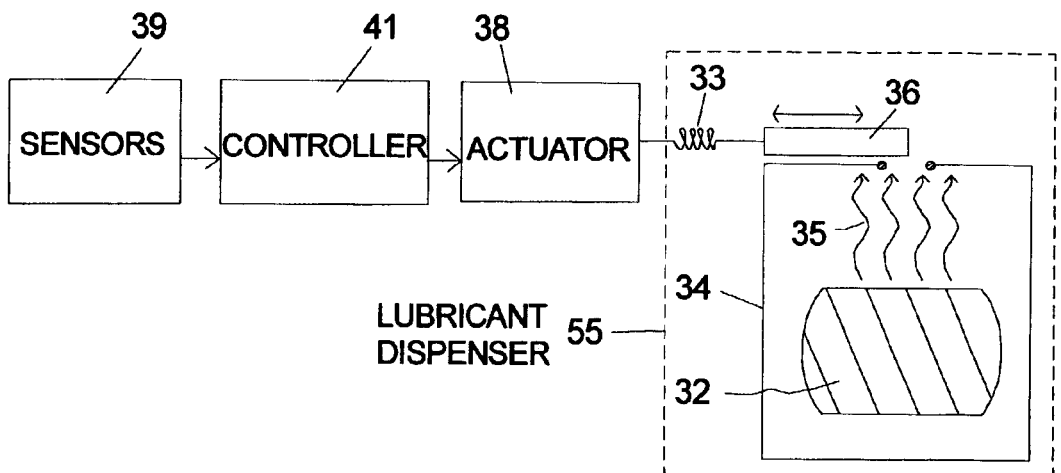
FIG. 2 is an illustration of a lubricant control system according to the invention having a controller and an actuator using a shutter to control the amount of lubricant vapor dispensed from the lubricant reservoir housing.

FIG. 2 illustrates an embodiment of the invention using a shutter 36 slidably positioned over orifice 37 in the lubricant reservoir housing 34. In alternative embodiments the shutter could be attached in other equivalent ways, for example, it could be rotatably mounted or mounted so as to allow it to be raised above the orifice 37. The lubricant packet 32 which has been previously impregnated with a suitable lubricant or a mixture of different lubricants is now inserted into lubricant reservoir housing 34 which can be a small box suitably placed inside the disk drive. This box can be as small as 5×5×5 mm but size is of no significance since the vapor stream emanating from the box is what is to be controlled. The shutter 36 and orifice 37 act as a shutter valve. The movement of the shutter 36 in relation to the orifice 37 opens or closes the valve. The position of the shutter 36 is controlled by an actuator 38 which is in turn controlled by controller 41. The actuator 38 can be any prior art device capable of the desired mechanical movement. In a preferred embodiment the actuator 38 is a piezoelectric (PZT) stage and the shutter 36 is mechanically biased by spring 33. Collectively lubricant reservoir housing 34, shutter 36, lubricant packet 32 and spring 33 are referred to herein as the lubricant dispenser 55. The controller 41 supplies the electrical signal for the actuator 38. The controller 41 uses the output from one or more sensors 39 to determine the needed increase or decrease in the lubricant. The controller 41 includes a combination of electronics and optionally microcode to process the output from the sensors using appropriate algorithms and send the control signals to the actuator 38.

In one embodiment a Quartz Crystal Microbalance (QCM) sensor is used to assess the degree of lubricant saturation in the free space inside the disk drive. The exact response to a QCM or any other sensor signal will be determined by controller 41 either by hardwired logic circuits and/or by a stored program. One method for implementing the controller's response to a sensed value is to use a look-up table. The values in the table could be derived, for example, as the result of empirical tests on prototype drives. In general, when the adsorbate thickness of the lubricant is too thin the shutter is opened and when the adsorbate thickness is too thick the shutter is closed. A Quartz Crystal Microbalance (QCM) can be used to measure the amount of adsorbate lubricant thickness. The QCM uses the frequency of a crystal to measure the adsorbate thickness of the lubricant on a vibrating quartz plate which has similar properties to the magnetic disks in the drive. The lubricant that adsorbs onto the disks within the drive is directly correlated with the thickness of lubricant that adsorbs onto the surface of the crystal of the QCM.

One embodiment uses sensors to keep track of the saturation of the lubricant vapor in the internal atmosphere of the drive relative to the initial concentration. If $P_o$ is the vapor pressure pure lubricant at any temperature T, then P is the prevailing non-saturated vapor within the drive at that same temperature. The controller 41 can be programmed to calculate the parameter $P/P_o$ and respond when the ratio $P/P_o$ drops below a threshold critical level or becomes too high. This low state then will trigger a response that will increase the lubricant vapor being released by retracting the shutter exposing a larger area of the orifice 37 or by energizing the lubricant.

Other environmental parameters which can be measured and fed to the controller 41 are temperature inside the drive and temperature of the lubricant in the reservoir. Preferably the average temperature is measured inside the disk drive close to the disks and heads. When the temperature is high (near the highest operating specification temperature) the vapor lubricant system can be stressed thus will benefit from additional lubricant to keep functioning without failure. Ordinarily, at high temperature a thin monolayer of lubricant on the disk's surface can suffer from molecular fragmentation ultimately leading to head/disk failure. At very low temperatures (well below the freezing temperature of water), the head/disk interface can also be stressed due to the poor mobility of the lubricant on the disk surface. To increase mobility, more lubricant for the disk surface can be obtained from the enclosed lubricant system according to the invention. In either extreme case, more lubricant vapor will be released from the reservoir to enhance lubrication on the surfaces of heads and disks in the disk drive.

Figure 3:
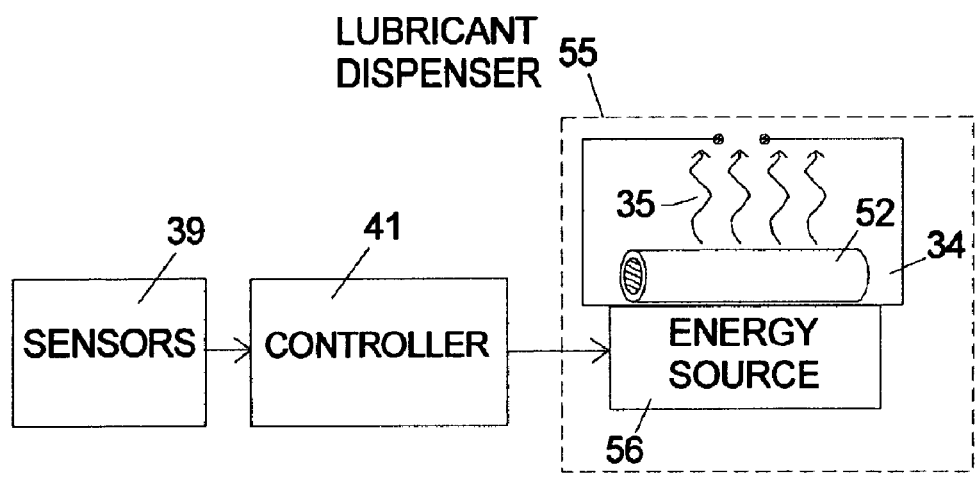
FIG. 3 is an illustration of a lubricant control system according to the invention having a controller and using an effusion cell and an energy source to control the amount of lubricant vapor dispensed from the lubricant reservoir.

Another environmental parameter which can be measured and fed to the controller 41 by sensors 39 is the measurement of the relative humidity level in the drive (water vapor content). For either a high or low extreme case of relative humidity in the drive, the change in the amount of lubricant vapor is warranted. The algorithm selected for mapping the humidity level to a specific response in the amount of lubricant being dispensed is beyond the scope of this application. In some cases, the lubricant dispenser will release lubricant vapor in a way that is a function of the relative humidity measured in the drive. Depending on the selected lubricant, the functional form of the modified release of lubricant may independently vary at both the high and low range of relativity humidity. In FIG. 3 another embodiment of the invention is illustrated which uses a simple effusion cell 52 that preferably has a 1 to 10 micron diameter hole at its maximum opening to the outside environment of the disk drive. Initially, the effusion cell is filled with volatile lubricant. The small hole in the center of the effusion cell allows the vapor inside the cell to communicate with all components of the disk drive. An energy source 56 is used to heat the lubricant in the effusion cell to increase the rate of vapor emission. Alternatively, the effusion cell can be effectively turned off when a thermoelectric cooler is applied. One type of energy source 56 for the effusion cell 52 is a simple thermal circuit that heats the cell to a predefined temperature At this higher temperature, the vapor will rapidly effuse from the cell and a maximum amount of coverage in the disk drive is assured in a short time period. Another type of energy source is a thermoelectric cooler which cools the cell to a predefined temperature. At the cooler temperature, the vapor effusion rate will be dramatically reduced, yet an enhancement can be obtained by the means described herein. Another energy source 56 for the effusion cell can be an ultrasonic transducer that will vibrate the cell at a predetermined frequency. This frequency will excite and heat the lubricant or lubricant mixture in the effusion cell to allow more vapor to steadily enter the drive environment. The ultrasonic and heat transducers will be controlled by the controller 41 using prior art techniques. Instead of using an effusion cell, an equivalent effect can be obtained by the use of a diffusion tube, which typically is a cylindrical tube of specific length and small constant diameter. An effective diffusion tube may have an irregular cross-section of effective length. In the embodiment of FIG. 3 a sensor for the temperature of the lubricant in the reservoir is preferable. Since it is important not to overheat the lubricant, a temperature sensor will provide useful information for managing the system. For the particular embodiment using a mix of volatile and nonvolatile lubricant in the reservoir, it is necessary to keep power low to not form an aerosol. In this embodiment auxiliary resistive heating in combination with ultrasonic energy is preferred to provide more precise control over temperature and mixing of the lubricant.

The sensors 39 can include prior art electronic control systems of the drive (including microcode, the servo system and arm-electronics) which have updated information about the read/write heads which include changes in fly height and MR resistance. Collisions between the slider and the magnetic media cause thermal spikes in the read head that affect the magnetoresistance. When the magnetoresistance goes very high or spikes repeatedly, the response of the electronic control system can include a signal to the controller 41 to increase the lubricant.

Figure 4:
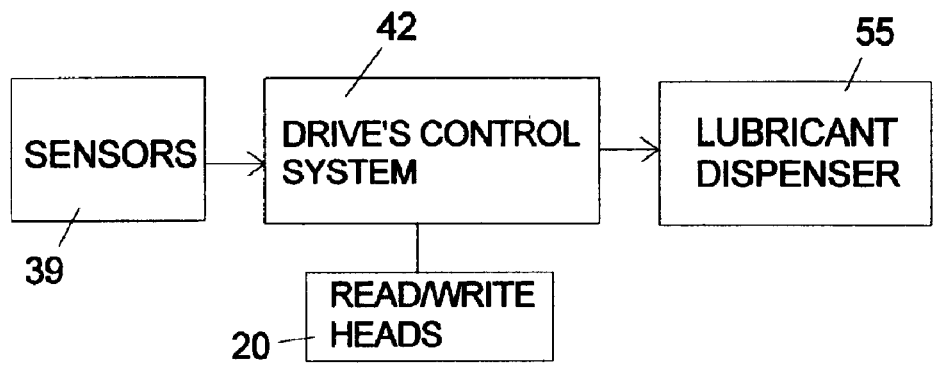
FIG. 4 is an illustration of a lubricant control system according to the invention using the control system of the storage device to control the amount of lubricant vapor dispensed from the lubricant reservoir housing.

In an alternative embodiment illustrated in FIG. 4, the drive's control system 42 (including microcode, the servo system and arm-electronics) can be programmed to perform the functions described above of controller 41. A prior art drive control system already includes one or more microprocessors and a large amount of microcode, so in this implementation additional microcode will be included to achieve the control algorithm for the lubricant. The lubricant dispenser 55 and the sensors 39 can be any type described herein.

Although the embodiments of the invention have been described in particular embodiments, the invention as described herein is not limited to this application and various changes and modifications will be apparent to those skilled in the art which will be within the scope of the invention.

What is claimed is:

1. A data storage device comprising:
    a magnetic transducer including a read and a write head for reading and writing magnetic transitions;
    a magnetic thin film recording medium;
    means for moving the recording medium in relation to the magnetic transducer;
    a first sensor having an output indicative of a need for an additional amount of lubricant on the recording medium;
    a lubricant dispenser comprising a lubricant reservoir housing with an aperture and a movable shutter having at least first and second positions with the first position covering the aperture to prevent lubricant vapor from escaping and the second position uncovering the aperture allowing lubricant vapor to escape;
    an actuator that selectively moves the movable shutter between the first and second positions; and
    a controller connected to the sensor, the controller being responsive to the output of the sensor by signaling the actuator to move the movable shutter to the second position uncovering the aperture allowing lubricant vapor to escape.

2. The data storage device of claim 1 wherein the actuator is a piezoelectric device.

3. The data storage device of claim 1 wherein the first sensor measures temperature inside the data storage device.

4. The data storage device of claim 1 wherein the first sensor measures an amount of the lubricant adsorbing on a surface inside the data storage device.

5. The data storage device of claim 4 wherein the first sensor is a Quartz Crystal Microbalance that measures an adsorbate response of the lubricant vapor inside the device.

6. The data storage device of claim 5 wherein the Quartz Crystal Microbalance is coated with a thin-film overcoat material substantially identical with a thin-film overcoat material on the magnetic thin film recording medium.

7. The data storage device of claim 1 wherein the lubricant dispenser contains a mixture of more than one type of lubricant.

8. The data storage device of claim 1 wherein the first sensor is a temperature sensor that measures temperature at the magnetic thin film recording medium; and the data storage device further comprises a second sensor that measures temperature of a lubricant in the lubricant reservoir housing means for determining a delta-temperature which is a difference between the temperature at the magnetic thin film recording medium and a present temperature of the lubricant; and wherein the controller uses the delta-temperature to determine whether to signal the actuator.

9. The data storage device of claim 1 wherein the first sensor measures a relative humidity inside the data storage device.

10. The data storage device of claim 1 wherein the first sensor measures a magnetoresistance of the read head.

11. The data storage device of claim 1 wherein the first sensor measures the fly-height of the magnetic transducer.

12. A data storage device comprising:
    a magnetic transducer including a read and a write head for reading and writing magnetic transitions;
    a magnetic thin film recording medium;
    means for moving the recording medium in relation to the magnetic transducer;
    a first sensor that measures an adsorbate thickness of the lubricant on a surface of the sensor having a thin film overcoat substantially identical with a thin film overcoat material on the magnetic thin film recording medium inside in the data storage device;
    a lubricant diffusion packet containing lubricant;
    an energy source for the lubricant diffusion packet that selectively energizes the lubricant forcing lubricant vapor to escape from the lubricant reservoir housing at a substantially enhanced rate; and
    a controller connected to the sensor, the controller being responsive to the output of the sensor by signaling the energy source to energize the lubricant in the lubricant diffusion packet based on the first physical parameter.

13. The data storage device of claim 12 wherein the lubricant diffusion packet is an effusion cell.

14. The data storage device of claim 12 wherein the lubricant diffusion packet is a cell fitted with a diffusion tube.

15. The data storage device of claim 12 wherein the energy source comprises an ultrasonic device and a resistive heating device.

16. The data storage device of claim 12 wherein the first sensor is a Quartz Crystal Microbalance.

17. The data storage device of claim 12 wherein the energy source is an ultrasonic transducer.

18. A method of operating a data storage device having moving magnetic media comprising the steps of:
    measuring a physical parameter indicative of a need for additional lubricant on the magnetic media; and
    opening a shutter that covers an aperture of a lubricant reservoir housing to increase an amount of lubricant vapor escaping from the lubricant reservoir housing when the physical parameter passes a predetermined threshold.

19. The method of claim 18 wherein the physical parameter is temperature.

20. The method of claim 18 wherein the measuring step uses a Quartz Crystal Microbalance (QCM) to measure an amount of lubricant adsorbing on a surface inside the data storage device.

21. A method of operating a data storage device having moving magnetic media comprising the steps of:
    measuring an amount of lubricant adsorbing on a surface of a sensor inside the data storage device having a thin film overcoat substantially identical with a thin film overcoat material on the magnetic media; and heating lubricant in a diffusion packet in a reservoir to increase an amount of lubricant vapor escaping from the reservoir when the parameter passes a predetermined threshold.

22. The method of claim 21 wherein the diffusion packet is an effusion cell.

23. The method of claim 21 wherein the diffusion packet is a cell fitted with a diffusion tube.

24. The method of claim 21 wherein the measuring step uses a Quartz Crystal Microbalance (QCM) to measures an amount of lubricant adsorbing on a surface inside the data storage device.

* * * * *